United States Patent [19]

Cannon, Jr. et al.

[11] Patent Number: 4,973,127

[45] Date of Patent: Nov. 27, 1990

[54] MULTIFIBER OPTICAL CONNECTOR AND METHOD OF MAKING SAME

[75] Inventors: Thomas C. Cannon, Jr., Randolph, N.J.; Bruce G. LeFevre, Atlanta; Clyde J. Myers, Stone Mountain, both of Ga.

[73] Assignee: AT&T Bell Laboratories, Murray Hill, N.J.

[21] Appl. No.: 359,453

[22] Filed: May 31, 1989

[51] Int. Cl.$^5$ .................... G03B 6/40; B23P 17/00; B65H 69/02

[52] U.S. Cl. .................... 350/96.22; 350/96.21; 350/320; 29/418; 29/419.1; 156/158

[58] Field of Search ............ 350/96.20, 96.21, 96.22, 350/320; 29/418, 419.1; 156/157, 158

[56] References Cited

U.S. PATENT DOCUMENTS

| | | | |
|---|---|---|---|
| 3,864,018 | 2/1975 | Miller | 350/96.20 X |
| 4,029,390 | 6/1977 | Chinnock et al. | 350/96.21 X |
| 4,279,468 | 7/1981 | Turley et al. | 350/96.21 |
| 4,657,341 | 4/1987 | Sammueller | 350/96.22 |
| 4,818,058 | 4/1989 | Bonanni | 350/96.20 |
| 4,830,456 | 5/1989 | Kakii et al. | 350/96.20 |
| 4,836,638 | 6/1989 | Finzel | 350/96.21 |
| 4,865,413 | 9/1989 | Hübner et al. | 350/96.21 |
| 4,898,449 | 2/1990 | Vroomen et al. | 350/96.21 |

FOREIGN PATENT DOCUMENTS 57-205704 12/1982 Japan .................... 350/96.20 X

OTHER PUBLICATIONS

C. M. Schroeder, "Accurate Silicone Space Chips for an Optical Fiber Cable Connector", Bell System Technical Journal, vol. 52, No. 1, Jan. 1978, pp. 91–97.
Kurokama, et al., "Precisely Moulded Plastic Splices for Optical Fibres", *Electronics Letters*, Nov. 20, 1980, pp. 911–912.
Satake, et al., "Low Loss Multifibre Connectors with Plug-Guide Grooved Silicon", *Electronics Letters*, Nov. 29, 1981, pp. 828–830.
Satake, et al., "Low-Loss Plastic Molded Optical Multifiber Connector for Ribbon-to-Single Fiber Fan Out", *Journal of Lightwave Technology*, vol. LT-3, No. 6, Dec. 1985.

*Primary Examiner*—Brian Healy
*Attorney, Agent, or Firm*—R. F. Kip

[57] ABSTRACT

Two plugs each comprises a pair of plastic guide plates with inner sides in which are formed duplicate groove patterns each consisting of parallel V-sided spaced grooves running through the plugs and divided into a central set of smaller "fiber" grooves and a pair of larger "pin" grooves on opposite sides of and spaced from the pin grooves. The two plates in each plug are disposed with their respective groove patterns registering with each other across a transverse gap such that the fiber grooves define a set of fiber channels extending through the plug from its rear to an end face on a front nose on the plug, the pin grooves defining a pair of pin channels having front openings rearward of such end face. Optical fibers from a ribbon type cable extend through the fiber grooves to the front of the nose. The two plates are bonded together by adhesive filling the spaces in the fiber channels around the fibers, and filling also the portions of the gap between adjacent fiber channels, but not occupying the gap between portions of the plates outward of the outermost fiber channels and including the pin channels. The two plugs are joined into an optical connector by a pair of aligning pins received in the pin channels of both plugs to hold them in nose-to-nose relation so as to align with each other the optical fiber ends respectively exposed at the front ends of one and the other of such plugs, and to produce, thereby, an optical splicing of the fibers, in respectively, the two plugs. The groove patterns in the plates in each plug may be derived from a common master pattern formed in a silicon chip.

28 Claims, 7 Drawing Sheets

MULTIFIBER OPTICAL CONNECTOR AND METHOD OF MAKING SAME

FIELD OF THE INVENTION

This invention relates generally to optical fiber connectors and, more particularly, to connectors of such kind for providing make-break connections between separate pluralities of optical fibers.

BACKGROUND OF THE INVENTION

In an article, published by C.M. Schroeder on pages 91–97 of the Jan. 1978 issue of the *Bell System Technical Journal*(Vol. 57, No. 1), and entitled "Accurate Silicon Spacer Chips for an Optical Fiber Cable Connector", the author discloses an arrangement for optically splicing two groups of optical fibers by providing for each group a connector comprising a stack of silicon chips. Each chip has on both its sides a set of spaced parallel "V" grooves registering (except for those on the outside stack faces) with the grooves of an adjacent chip to define a plurality of fiber-aligning channels which extend through the stack, and in which channels are received the end sections of the fibers in the corresponding group. The splicing of the fibers in the two groups is effected by butting the two stacks end to end so as to produce as close as possible to an exact alignment between the fibers in one stack and the corresponding fibers in the other.

The mentioned arrangement has been successful in producing optical fiber splices having relatively low loss due to misalignment of the fibers at the splice. The scheme has the deficiencies, however, that, while the use of silicon chips as the carriers for the fiber channel producing "V" grooves permits those grooves to be located on the chip with great accuracy to promote the exact aligning of fibers to be optically spliced, such chips are too costly to lend themselves to extensive commercial use. Moreover such chips are so fragile as to make their use inconvenient in interconnecting optical fibers in the field. Aluminum chips would not have such deficiencies, but the author points out that aluminum chips could not be manufactured repeatedly with the high dimensional accuracy required. Indeed, it is acknowledged in the article that even the silicon chips described therein had thickness variations which were contributions to splice loss.

SUMMARY OF THE INVENTION

The aforementioned and other deficiences are obviated according to the invention in one of its aspects by providing a two-plug multi-fiber optical connector in which each plug comprises two synthetic-resinous transversely-spaced juxtaposed guide plates having confronting inner sides in each of which is formed a set of parallel smaller grooves and a pair of larger grooves on laterally opposite sides of that set. The smaller grooves in the two plates of each plug register to define a plurality of channels through that plug in which are received sections of corresponding optical fibers fed into the plug to terminate at ends of the fibers at the front of the plug. A pair of larger grooves in the two plates of each plug likewise register to define a pair of channels in each plug for reception in each channel of an aligning pin. A pair of such pins are, in the use of the connector, inserted with a playless fit partly in such channels of one of such plugs and partly in such channels of the other. The inserted pins align the pair of plugs front-to-front, so precisely that corresponding fiber ends in one and the other of the plugs are optically spliced together with very little loss ensuing at the splice. Because the alignment of the plugs is effected by pins playlessly contacting the plugs at or near their respective transverse center planes at or near which the fiber ends are also located (rather than contacting such plugs at their transversely outer sides), misalignment of the plugs due to variations from normal in the thickness of their plates is avoided, and the transverse alignment between plugs of the ends of the fibers included therein is rendered largely or entirely independent of such thickness variations.

BRIEF DESCRIPTION OF THE DRAWING

For a better understanding of the invention according to its aspect described above and to other aspects thereof, reference is made to the following description of an exemplary embodiment thereof, and to the following drawings wherein.

In the description which follows, elements designated by the same reference numbers or letters but by different suffixes for these numbers or letters are counterpart elements, and a description of one such element shall, unless the context otherwise indicates, be deemed to apply similarly to its counterpart(s).

DETAILED DESCRIPTION OF EMBODIMENT

Figure 1:
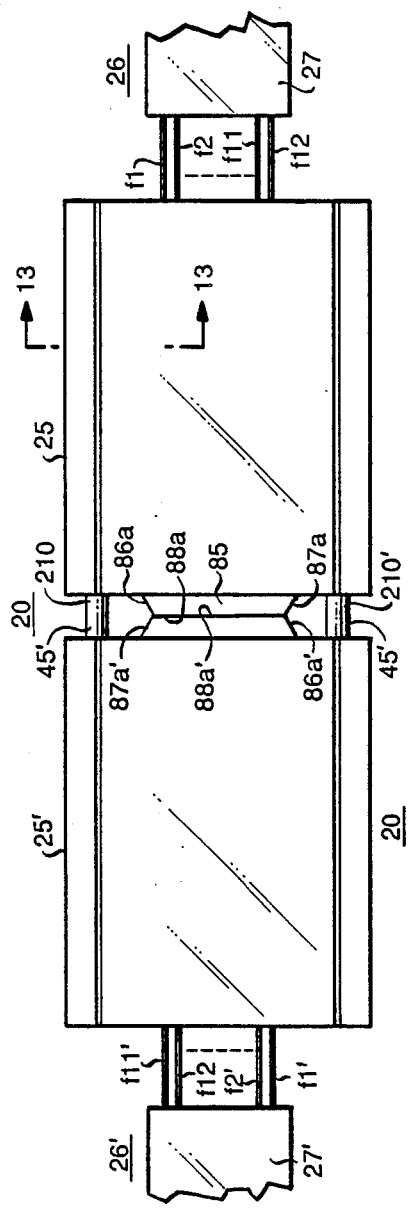
FIG. 1 is a schematic plan view of a multifiber optical connector according to the invention.

Referring now to FIG. 1, the reference number 20 designates a multifiber optical connector comprising right and left hand plugs 25, 25' constituting respective terminations for separate optical fiber cables 26, 26'. Cable 26 comprises a synthetic resinous ribbon 27 in the body of which are embedded twelve laterally spaced optical fibers f (individually designated f1, f2 . . . f11, f12) of which some are shown in FIG. 1. Cable 26' comprises a similar ribbon 27' in which are embedded similar optical fibers f. The fibers f and f each comprise a core and cladding, and may be either single mode or multimode fibers. Lengths of the fibers pass forwardly through their corresponding plugs to terminate in fiber ends exposed at the front surfaces of the plugs.

Figure 2:
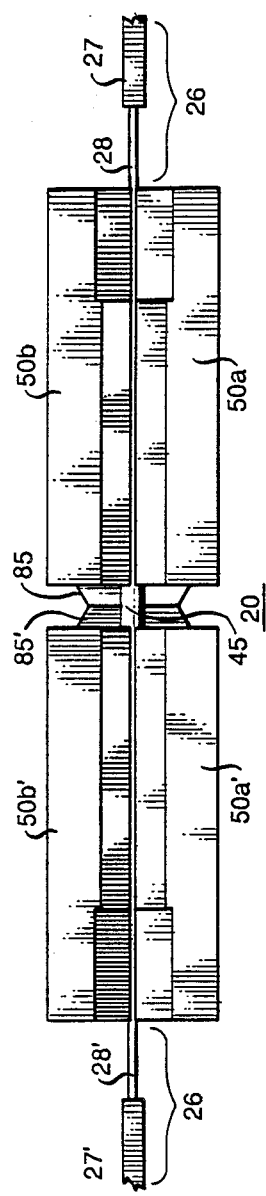
FIG. 2 is a schematic front elevation of the FIG. 1 connector.

The two plugs are shown in FIGS. 1 and 2 as being coupled together by a pair of aligning pins 45, 45' each received partly in one plug and partly in the other to form the assembled connector 20. The pins 45, 45' are metal or ceramic pins dimensioned with great precision and having good dimensional stability. Those pins position the plugs relative to each other to produce an accurate alignment of the end of each fiber in plug 25 with the end of the corresponding fiber in plug 25'. The result is a low loss optical splice between the fibers f of cable 26 and their counterpart fibers f of cable 26'.

Figure 3:
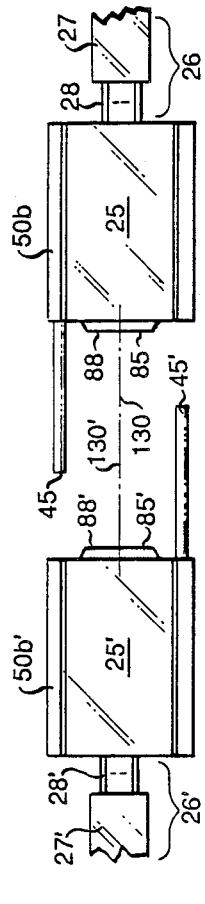
FIG. 3 is a schematic plan view of the FIG. 1 connector with its left-and right-hand plugs being uncoupled from each other.

The optical interconnection of the two sets of fibers may readily be interrupted by detaching plugs 25 and 25' from each other to become decoupled as shown in FIG. 3. When the plugs are so decoupled, the pins 45 and 45' are shown as remaining in the plugs 25 and 25', respectively. If desired, however, both of the pins may remain in the plug 25 or the plug 25', or both pins may be entirely separated from both plugs. Because the plugs 25 and 25' may selectively be coupled and decoupled, the described connector 20 is a make-break connector well adapted for field use.

Figure 4:
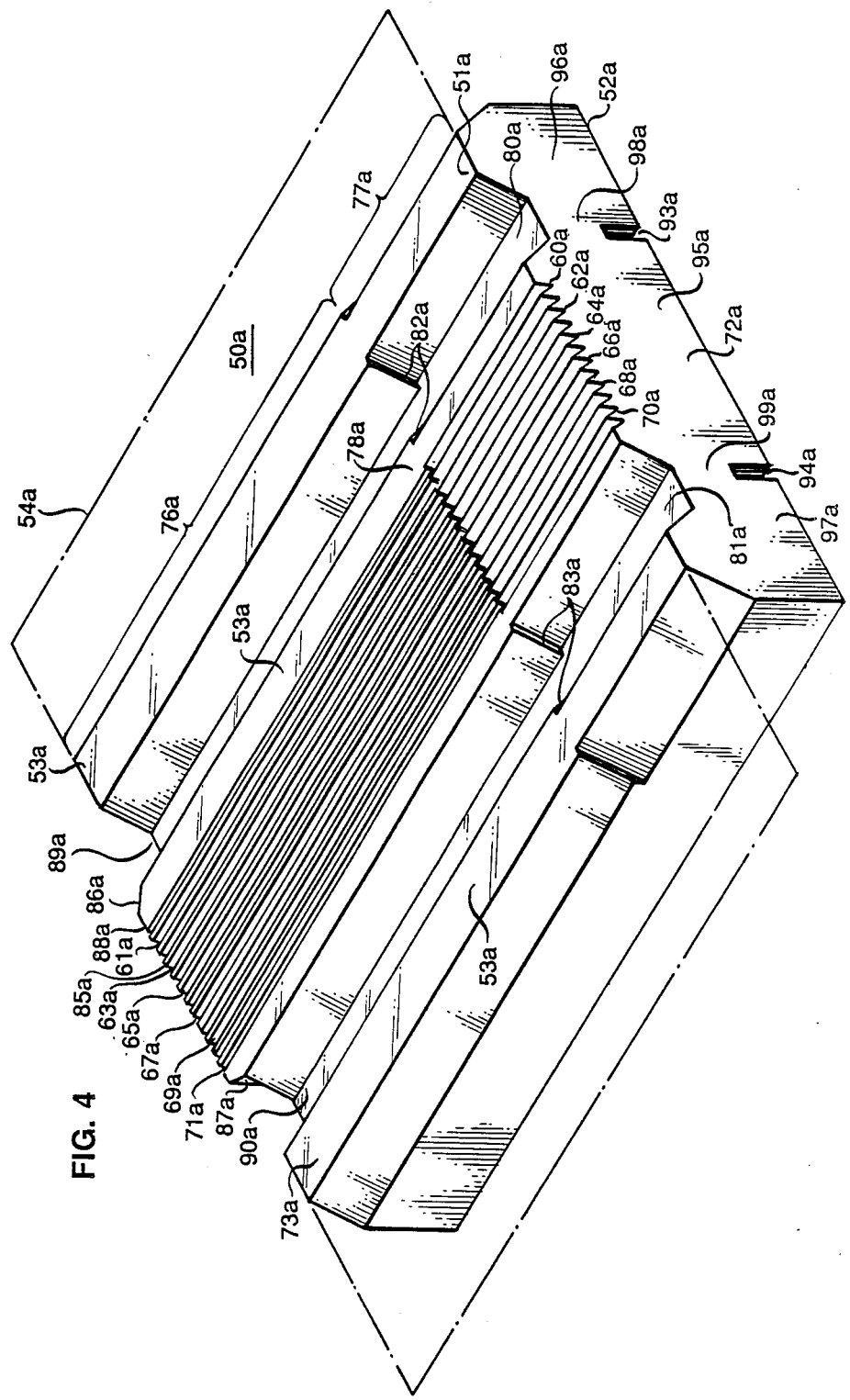
FIG. 4 is an isometric view of a lower guide plate included in the right-hand plug of FIG. 3.

Plug 25 comprises lower and upper synthetic resinous guide plates 50a, 50b, plug 25' comprising similar guide plates 50a', 50b'. Plates 50b, 50a', 50b' are duplicates of guide plate 50a of which details are shown in FIG. 4. All such guide plates may be constituted, for example, of glass filled thermoset epoxy such as PLASKON 2929B sold by PLASKON Electronic Materials, a subsidiary of Rohm & Haas Company.

Referring to FIG. 4, plate 50a is a generally rectangular body having inner and outer parallel sides 51a, 52a vertically separated from each other in the transverse or thickness dimension of the plate. Inner side 51a has an upwardly presented face 53a extending longitudinally and laterally in a horizontal inner face plane 54a for such plate. Formed in a laterally central region of such inner side 51a is an array of twelve laterally spaced parallel fiber receptacle grooves 60a–71a extending transversely into the body of plate 50a from its face 53a. Those grooves are all parallel to the longitudinal axis 130 (FIG. 3) of the plate, and they all run from the plate's rear 72a to its front 73a. The grooves are V-sided in the sense that each groove has two laterally separated planar side walls defining two planes which meet at a line of intersection to define a dihedral angle bisected by the plane passing through that line and perpendicular to the face plane 54a. In the fiber grooves of the plate 50a, the mentioned sidewalls of each groove extend all the way down to a common intersection line to render such groove of full "V" configuration in lateral-transverse cross-section. However, those sidewalls of such V-sided grooves may, for each, terminate at a flat groove bottom short of such intersection so that the groove is of truncated "V" configuration in cross-section. Further, such V-defining sidewalls of such grooves need not reach all the way to the face 53a from which the grooves 60a–71a extend transversely into the plate.

The grooves 60a–71a are divided into respective forward portions and respective rear portions lying in, respectively, a forward interval 76a and a rear interval 77a of the side 51a of the plate 50a. Over the length of the forward portion of each such groove, it is of uniform cross-section, and the same is true over the length of its rear portion. However, the rear portion of that groove is larger in cross-section than its forward portion. Between the mentioned intervals 76a and 77a is a zone 78a of short length in which the bounding walls of the grooves 60a–71a are tapered to provide faired transitions from their larger cross-section section rear portions to their smaller cross-section front portions. The enlarging of the rear parts of the grooves 60a–71a facilitates the inserting therein of the optical fibers f.

The array of fiber grooves 60a–71a is flanked on its laterally opposite sides by a pair of pin receptacle grooves 80a, 81a formed in the inner face 53a of plate 50a and extending longitudinally in that plate from its rear 72a to its front 73a in parallel relation with grooves 60a–71a. The pin grooves in lateraltransverse cross-section have a cross-sectional area larger by at least one order of magnitude than that of the fiber grooves. Moreover, while the pin grooves 80a, 81a are V-sided grooves in the sense described above, they have flat bottoms so that they have a truncated "V" cross-sectional configuration rather than one which is a full "V".

Within the rear interval 77a of plate 50a, the pin grooves 80a, 81 have rear portions of slightly enlarged cross-sections relative to that of their front portions in interval 76a. In the case of the pin grooves, however, there is no tapered transition between their front and rear portions. Instead at the intersection of those portions, the bounding walls of the grooves 80a, 81a have formed therein rearward-facing shoulders 82a, 83a extending perpendicular to the axes of the grooves and adapted to act as stops.

Figure 6:
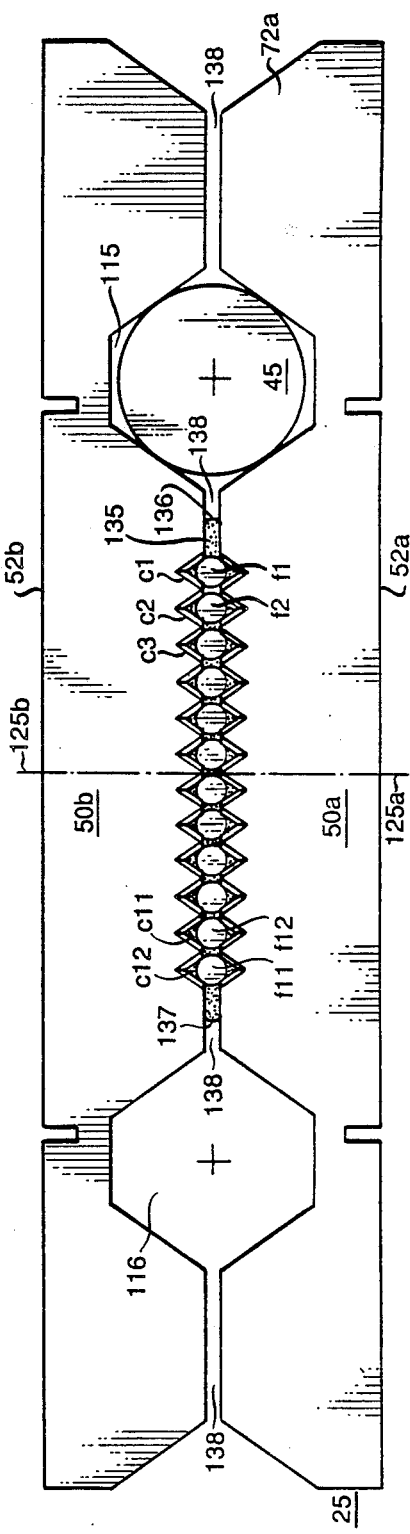
FIG. 6 is a right side elevation of such right hand plug.
Figure 7:
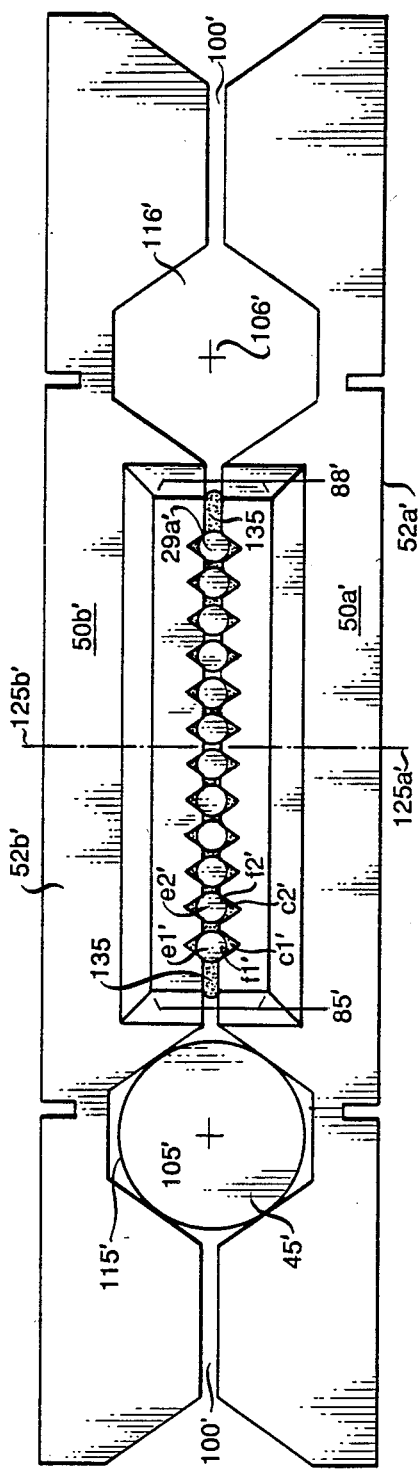
FIG. 7 is a right side elevation of the left hand plug of FIG. 3.

The plate 50a in its laterally central region has a pedestal 85a projecting forwardly from the surrounding area of the plates front end 73a and having slanted side walls 86a, 87a convergently tapering forwardly to a planar end face 88a for the pedestal. End face 88a is perpendicular to both the plate's inner face plane 54a and its transverse-longitudinal center plane 125a (FIGS. 6 and 7). As shown, the fiber grooves 60a–71a extend forwardly through pedestal 85a to openings thereof included within end face 88a. On the other hand, such end face projects forward of and is laterally inward of the forward terminations 89a, 90a of the pin grooves 80a, 81a.

The outer side 52a of plate 50a has formed therein a pair of slots 93a, 94a extending longitudinally through the plate from its rear 72a to its front 73a. In the lateral dimension, the slots 93a, 94a are disposed adjacent the laterally inward margins of the pin grooves 80a, 81a. The two slots extend transversely into the material of plate 50a to divide it into a central region 95a disposed laterally between the slots, and into two outer regions 96a, 97a outside the slots. The slots 93a, 94a reduce the transverse-longitudinal cross-section of the plate transversely inward of the slots so as to form necks 98a, 99a by which central region 95a is connected to the outboard regions 96a and 97a, respectively.

Figure 5:
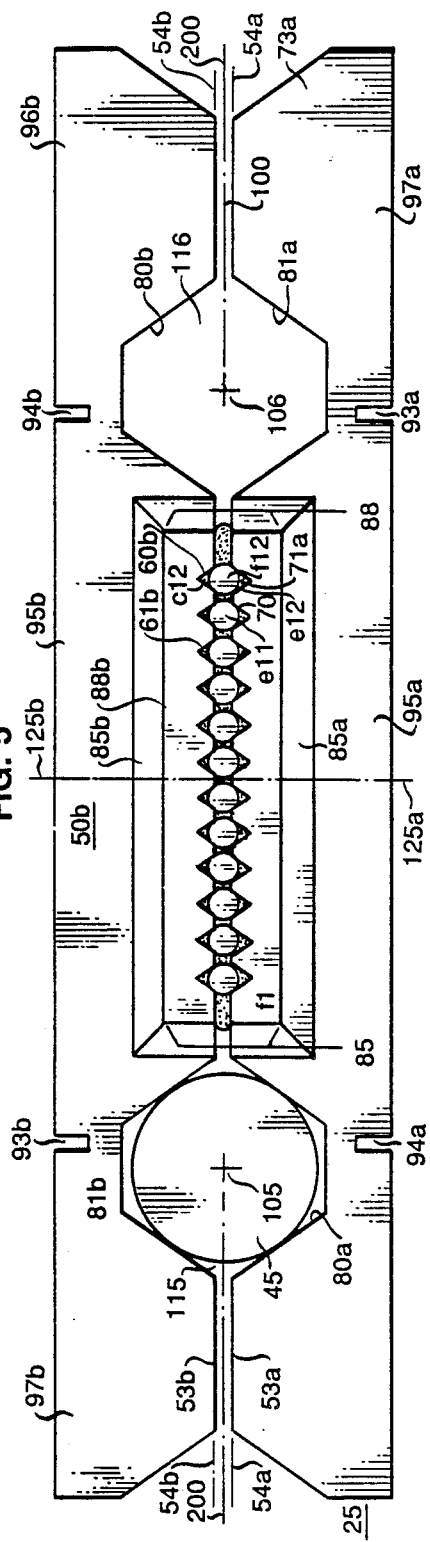
FIG. 5 is a left side elevation of such right hand plug.

Turning now to FIGS. 5 and 6, the lower guide plate 50a is shown disposed in plug 25 in assembled relation with the upper guide plate 50b so that the two plates are in vertically juxtaposed relation with their respective inner faces 53a, 53b confronting each other and being separated by a transverse gap 100 between those faces.

The two plates moreover are aligned in the lateral direction so that their respective fiber grooves 60a–71a and 60b–71b register with each other across gap 100 to define twelve fiber receptacle channels c (individually designated as c1, c2 . . . c11, c12) extending longitudinally through plug 25. Each such channel comprises (i) a fiber groove in the lower plate, (ii) the fiber groove in the upper plate directly above such lower fiber groove and (iii) the portion of the gap between such two grooves. As exemplified, however, by fiber channel c1, the two grooves 60a and 71b which are components of that channel don't match in their reference numerals. That lack of match is due to the fact that plate 50b, although a duplicate of plate 50a has, from a starting position the same as plate 50a, been rotated 180° about a horizontal axes in the course of positioning plate 50b above plate 50a.

Similarly, the pin grooves 80a, 81a, 80b, 81b of the two plates register with each other across gap 100 to define two pin channels 115 and 116 extending longitudinally through plug 25. Pin channel 115 comprises grooves 80a, 81b and the gap portion between them, while pin channel 116 comprises grooves 81a, 80b and their common gap portion. Channel 115 is shown as having received therein the aligning pin 45. The longitudinal axes 105, 106 of the pin channels 115, 116 are transversely disposed to be within gap 100.

The optical fibers f1 . . . f12 associated with plug 25 (FIG. 1) are received in fiber channels c1 . . . c12, respectively, to extend therein forwardly to planar ends e (individually designated as e1, e2 . . . e11, e12) of such fibers at the front of the plug. Also in these channels are portions of a body 135 (FIG. 6) of adhesive material providing plate retaining means fastening the plates 50a, 50b together in their relative positions shown in FIGS. 5 and 6. The adhesive material of body 135 fills all the space in channels e not occupied by the fibers f to embed the fibers in that material. Moreover, such material fills the lateral portions of gap 100 which lie between adjacent ones of these channels and, also, two short lateral portions of such gap which are outwards of the outside channels c1 and c12. Outwardly, however, of these channels the adhesive body 135 laterally terminates at edges 136, 137 for such body which are laterally inwards of the pin channels 115, 116. Thus the lower and upper plates 50a, 50b are adhesively bonded together only between the edges 136 and 137. Laterally outwards of those edges, the plates remain separated by portions 138 of the gap 100 which are still air gaps.

The pedestals 85a, 85b on guide plates 50a, 50b cooperate to form for the plug 25 a forwardly projecting nose 85 having a planar end face 88 normal to the longitudinal axis 130 of plug 25. Areas of face 88 are provided by the end faces 88a, 88b of the two pedestals, other areas are provided by the exposures (in the plane of that end face) of the adhesive material 135 in gap 100, and still other areas are provided by the exposures (in that plane) of the forward ends e of the optical fibers f.

Figure 8:
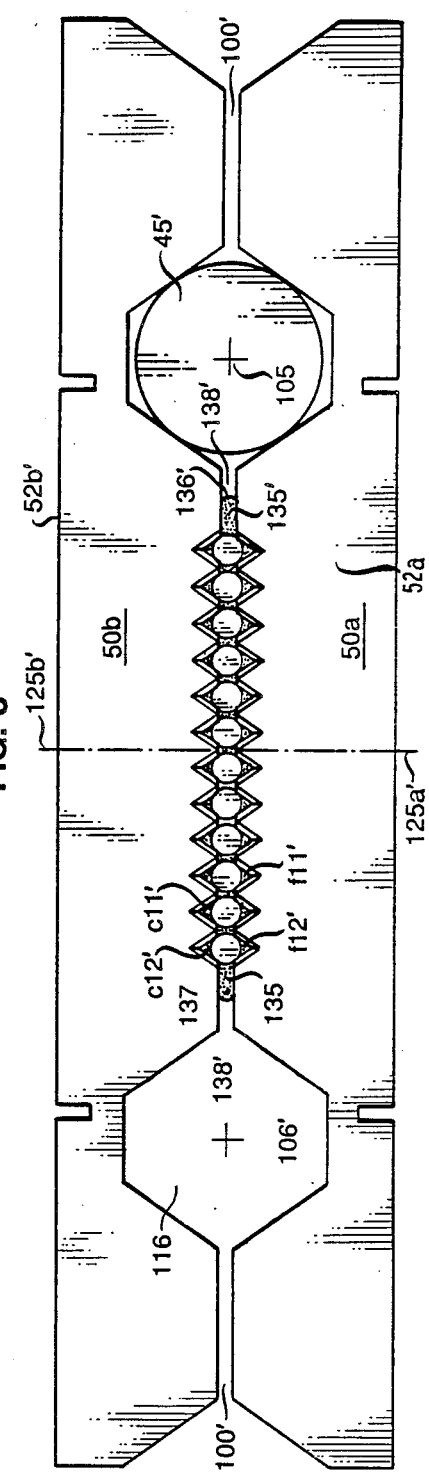
FIG. 8 is a left side elevation of such left hand plug.

As indicated by FIGS. 7 and 8, the structure of plug 25' duplicates that of the plug 25. Aligning pin 45' is received in the pin channel 115' of the plug 25'. The nose 85' of that plug has a planar end face 88' normal to the longitudinal axis 130' of plug 25'. Areas of that end face 88' are provided by (i) the end faces 88a', 88b' of the pedestals on the lower and upper guide plates in the plug, (ii) exposures in the plane of that end face of the material of adhesive body 135', and (iii) exposures in that plane of the ends e' of the optic fibers f received in plug 25'.

Fabrication of the Embodiment

Figure 9:
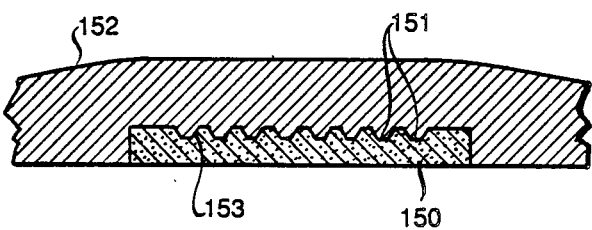
FIG. 9 is a schematic cross-sectional fragmentary view of a manner of forming a mold insert used in fabricating the FIG. 4 guide plate and other guide plates.

In order to obtain by connector 20 a low loss at the optical splice of the fibers f and f; it is necessary that the groove patterns formed in the guide plates 50a, 50b, 50a', 50b' mate with each other with higher precision than would easily be realizable by machining these plates to form the whole of such patterns. Such machining caused problems are avoided in fabricating connector 20 by starting (FIG. 9) with a master silicon chip 150 (or several such chips) in which the desired groove pattern 151 can be formed with great accuracy by the use of well known photolithographic techniques. After pattern 151 has been so formed, the chip is clad by electroforming with a thick metallic deposit or "slug" 152 which has formed in its lower face a negative replica 153 of the groove pattern 151 in the chip. Slug 152 is them removed from the chip and machined to convert it into a mold insert.

The insert is subsequently placed in a mold in which the plates 50a, 50b, 50a', 50b' are produced by transfer molding, and in which a positive replica of the original silicon chip groove pattern appears on the inner side of each plate. In such connection, while it is convenient for all the guide plates in a particular connector 20 to be derived form a single silicon chip 150, the groove pattern can be reproduced in silicon with such accuracy that more than one master chip (each with the same groove pattern formed therein) can be used to provide different of the guide plates in the connector. Moreover, in creating the mold insert, those of its portions which do not correspond to the guide plate groove portions used for accurately positioning the fibers and aligning pins (such non-corresponding portions being the parts of slug 152 used to produce the pedestal 85 and the enlarged groove portions at the rear of the guide plate) may be formed by machining rather than being derived from a silicon chip.

For further details on methods for molding plastic replicas of groove patterns originally formed in a silicon chip by the use of an intermediate electroformed metallic negative replica of such pattern, reference is made to Japanese Public Patent Report 6952-H open to the public, Dec. 16, 1982.

Figure 10:
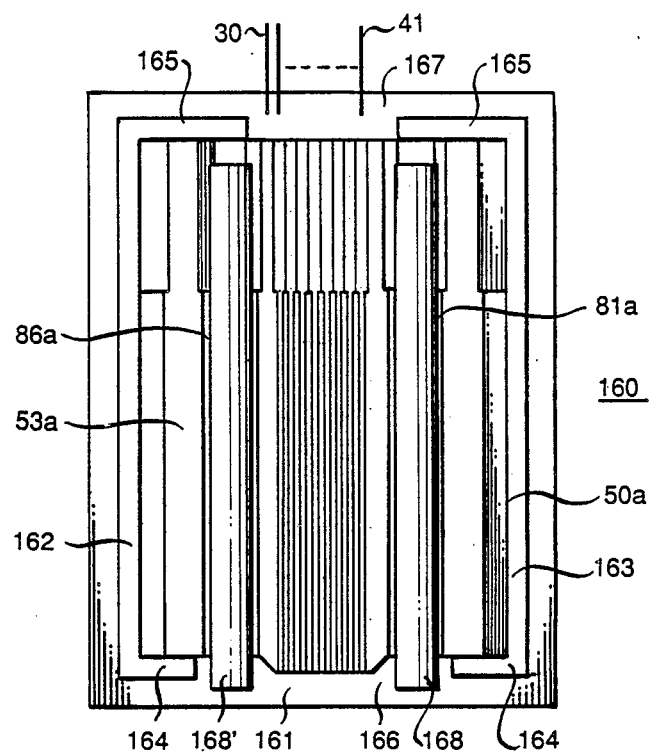
FIG. 10 is a schematic plan view of (a) a holding fixture used in the assembling of the plugs shown in FIG. 3, and (b) of the FIG. 4 guide plate received in that fixture.

The plug 25, for example, is assembled by the use of a crib fixture 160 (FIGS. 10 and 11) comprising a base 161 having upstanding therefrom vertical side walls 162, 163 and vertical front and rear walls 164, 165 with central openings 166, 167 therein. Walls 162–165 define on the upper surface of base 161 a rectangular enclosure within which guide plates 50a, 50b fit with small clearance in relation to such walls.

Figure 11:
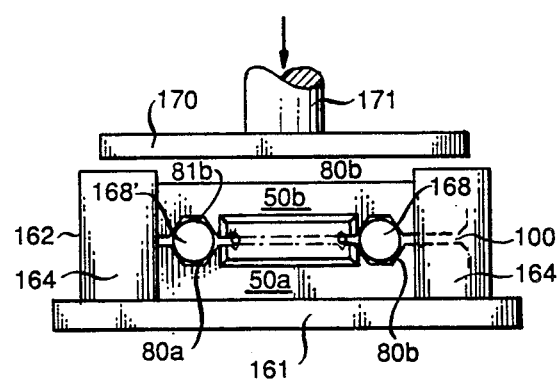
FIG. 11 is a schematic front elevation of the FIG. 10 fixture, and of both guide plates of the right hand plug received in that fixture.

To start the assembly, guide plate 50a is placed on such surface in such enclosure with the plate's inner face 53a being upward. There is then passed through opening 167 into the pin grooves 80a, 81a, a pair of spacer pins 168, 168' of greater diameter than the aligning pins 45, 45' already described. On top of those pins is next added guide plate 50b (FIG. 11). The presence of the spacer pins between the plates 50a, 50b provides a preliminary alignment in the lateral direction between the grooves in the two plates. Moreover, the insertion of pins 168, 168' (in contrast to pins 45, 45') into the pin channels between those plates serves to increase the size of the transverse gap between them to thereby make easier the insertion of the optical fibers f between the plates.

As a following step, the optical fibers f are inserted into the fiber receptacle channels c and are pushed forward therein until the fiber ends e project slightly beyond the forward terminations of those channels. The spacer pins 168, 168' are then removed, one at a time, from between the plates 50a, 50b. When this is done, plate 50b settles down on the fibers f to be supported above plate 50a by those fibers.

Above guide plate 50b is positioned a horizontal pressure plate 170 fixed to a vertically movable plunger 171 and held thereby so that the lower surface of plate 170 is and remains parallel to the upper surface of base 160 during plunger operation. The downward force exertable by plunger 171 is controllable in magnitude. The plunger 171 is actuated to advance plate 170 in contact with the top of guide plate 50b and then urge it down to press together, with a moderate selected amount of force, the guide plates 50a, 50b and the fibers f therebetween. While the plate assembly is under such force, the material of adhesive body 135 is introduced into the fiber channels c and into gap 100. That is done by applying such material in liquid form to the rear channel openings of the fiber channels so as to cause wicking of the liquid between plates 50a, 50b and ultimate formation of the adhesive body 135 shown in FIGS. 5 and 6. The adhesive material, a thermosetting epoxy for example, is then cured. At the end of the curing period, the adhesive body 135 firmly bonds the guide plates 50a, 50b together in positionally fixed relation, and the assembled plug 25 (with fibers f and ribbon 27 attached) is removed from fixture 160.

Figure 12:
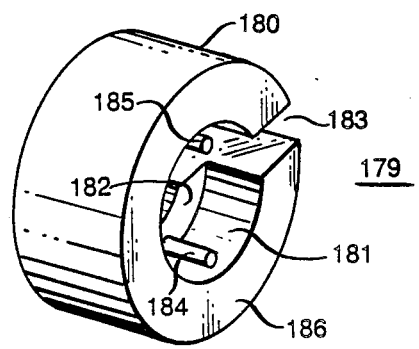
FIG. 12 is a schematic isometric view of a fixture used as an aid in polishing the front end faces of FIG. 3.

FIG. 12 shows a polishing fixture 179 comprising a hollow cylinder 180 with an open top 181 and an annular bottom 182 extending around a circular aperture (not shown) having a diameter greater than the width of ribbon 27 of cable 26 and less than the spacing between the pin channels 115, 116 (FIG. 5). A slot 183 passes radially through the wall of cylinder 180 and extends radially through the bottom 182 therefor from the outside of fixture 179 to the mentioned aperture. Outstanding from such bottoms are a pair of fixture positioning pins 184, 185 on opposite sides of such aperture. Cylinder 180 terminates at its top 181 in a split annular planar end face 186 providing a reference surface.

Fixture 179 is used as follows with the assembled plug 25 and attached ribbon cable 26. Plug 25 is initially positioned out beyond the top of the fixture with cable 26 running past the fixture in alignment with and outside slot 183. The cable is then inserted through the slot into the interior of cylinder 180 so that the cable axially passes through the aperture in bottom 182. Plug 25 is then moved into the interior of fixture 179 so as to advance the fixture's pins 184, 185 into the enlarged rear portions of the pin channels 115, 116 of the plug. Such advance continues until stopped by engagement of the fronts of such pins with the shoulders 82, 83 (FIG. 4) in these channels. Fixture 179 thereby becomes fixed in position relative to plug 25.

Once the fixture has been so positioned, its surface 186 defines for the end face 88 of nose 85 of the plug a plane normal to the longitudinal axis 130 of plug 25 or in other words normal to its planes 54 and 105. A sheet of emery or sandpaper (on the planar front side of a backing member therefor, not shown) is used to grind down that end face until further movement of the sandpaper or emery towards the back of the plug is arrested by flat engagement of the abrasive with all parts of fixture surface 186. At this point, the end face 88 of the plug, the ends e of the fibers f therein and the adhesive material 135 at the front of nose 85 will all be in the form of polished areas in the mentioned reference plane. Once such polishing is complete, plug 25 and attached cable 26 are removed from fixture 179.

Plug 25' is made, assembled and polished in like manner to that set out above. The two completed plugs are then coupled and aligned by aligning pins 45, 45' to form connector 20, all as earlier described. Either of such pins may be either removably inserted into the pin channel of the plug by which that pin is carried or, alternatively, may be permanently anchored in that channel by adhesive.

Features of the Embodiment

Further consideration will now be given to features of the connector 20 which contribute to the low loss optical splicing provided thereby.

As used herein, the term "nominal" refers to that positioning, size or other dimensional feature of something which it would actually have if there were no deviation whatever of such positioning, size or other dimensional feature from a numerically specified value therefor.

Good intra-plug alignment in the lateral direction of the lower and upper fiber grooves and pin grooves in the assembled plug 25 (FIGS. 5, 6 and 11) is attainable primarily because of two features. The first is that the groove patterns in the upper and lower guide plates 50b and 50a are duplicates by virtue of being derived from the same groove pattern in the single master silicon chip 150 (FIG. 9) or from being derived from identical groove patterns formed in a plurality of such master silicon chips. The second feature is that the fiber grooves and pin grooves in each of plates 50b and 50a are bilaterally symmetrical in their positioning and dimensioning about the transverse-longitudinal center planes 125b, 125a of such plates.

It is the characterizing of the fiber grooves of such two plates by such two features which enables a good lateral alignment to be obtained in plug 25 between the lower and upper fiber grooves despite the fact that plate 50b (and its groove pattern) must be rotated 180° around a horizontal axes relative to plate 50a (and its groove pattern) in the course of vertically superposing plate 50b (FIGS. 5, 6 and 11) on plate 50a.

Moreover, it is desirable in order to obtain such good lateral alignment of such fiber grooves that the pin grooves of such upper and lower plates also be characterized by such two features. That is so for the following reasons. It is the fact that, upon removal of the spacer pins 168, 168' from between plates 50a, 50b and subsequent application from pressure plate 170 of pressure to those two guide plates (FIG. 11), the lateral alignment ultimately assumed by the upper and lower pin grooves will be determined by the optical fibers f squeezed between these guide plates. Preliminarily, however, the pin grooves should be characterized (to at least an extent) by the mentioned two features in order to prevent the insertion of the spacer pins into the pin channels formed by those pin grooves from laterally misaligning the upper and lower fiber grooves so far that such misalignment would, say, prevent the feeding of the optical fibers into the channels defined between the upper and lower fiber grooves.

Further in respect of the pin grooves, if their actual positioning in the upper and lower guide plates were to depart too much from a bilateral symmetrical positioning thereof, then after plates 50a and 50b were bonded together by adhesive as earlier described (FIGS. 10 and 11), the upper and lower pin grooves might be so laterally misaligned as to fail to define appropriate pin channels between them for insertion of the aligning pins 45, 45'.

Plugs 25 and 25' have differentiated front and rear portions thereof in that their fronts have noses thereon while the rear portions have none, the grooves in such portions are enlarged in size at the rear of the plugs as compared to their front size, and so on. In the case, however of plugs which are like 25, 25' but which are longitudinally undifferentiated, the groove patterns in the upper and lower guide plates need not be bilaterally symmetrical. That is so because, even if they are not, by first rotating the upper plate (from a starting position the same as the lower plate) 180° about its vertical axis, then rotating it 180° about its longitudinal (horizontal axis) and then superposing it on the lower plate, the groove patterns in the two plates will still match to permit proper lateral and transverse alignment of the grooves therein. Even in that case, however, the groove patterns in the two plates should be duplicates, and it is still necessary to rotate, as described, the upper plate 180° about its longitudinal axis.

Coming now to the matter of intra-plug transverse alignment, it was earlier described (FIG. 11) that, with the optical fibers f being inserted in their fiber channels c defined by the fiber grooves of plates 50a, 50b, force is applied by elements 170, 171 to such superposed plates and is maintained until such plates have become bonded together by adhesive 135. Both those fiber grooves and the fibers therein will inevitably have some deviation from nominal in their cross-sectional size. Despite that fact, however, an amount of such force can be (and is) selected to press together plates 50a, 50b to decrease gap 100 between them to the point where, despite such deviations, the respective axes a (individually designated a1, a2 . . . ) of all the fibers f lie in a common plane 200. The magnitude of the force needed to provide that result is determinable by trial and error.

Figure 13:
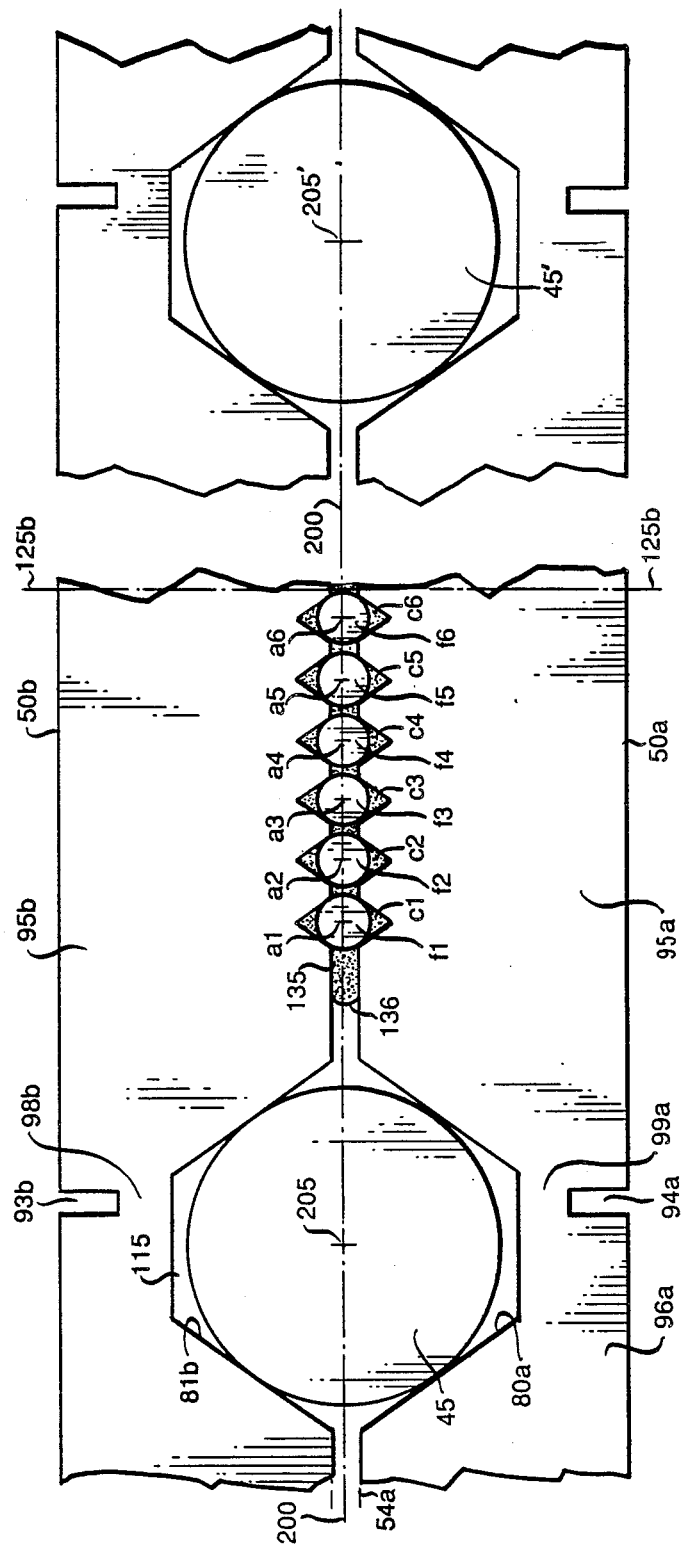
FIG. 13 is an enlarged cross-sectional view, taken as indicated by the arrows (1-13 in FIG. 1, of a portion of the right hand plug of the FIG. 1 connector.

As shown in FIG. 13, plane 200 is the center plane of gap 100 and is disposed parallel to and midway between the respective face planes 54a, 54b of plates 50a, 50b. The relative cross-sectional sizes of the pin grooves and optical fibers should be chosen so that as taught in U.S. Pat. No. 3,864,018, application of such force does not reduce to zero the size of gap 100. That the axes a of all such fibers can so be made to be in center plane 200 is attributable to various factors such as the duplicate character of the upper and lower fiber grooves of each fiber channel in the plates 50a, 50b, the geometry favorable to that result of squeezing the fibers between pairs of V grooves on opposite sides of the fibers, and the fact that the synthetic resinous material of the plates 50a, 50b is resiliently deformable to yield to accommodate oversize fibers in the fiber channels.

Center plane 200 includes not only the axes of the optical fibers 30-41 but also the axes 205, 205' of the aligning pins 45, 45' when received in the plugs 25 and 25'. The inclusion of such axes in that plane reduces or removes the possibility of transverse misalignment of the plugs 25 and 25' even when plug 25' is positioned "upside down" relative to plug 25. Indeed, the positioning of the alignment pin axes in plane 200 cancels out the transverse misaligning effect of transverse deviations from nominal in the size of the pins and other dimensional features of plug 25. Note however that for such pin axes to be in plane 200, more of the diameter of the pins is required to be in the pin grooves than the fraction of the diameter of the fibers in the fiber grooves.

Plug 25' will of course have the same features as those of plug 25 described above. The incorporation of such features in both plugs results not only for each, in the good "intra-plug" lateral and transverse alignment which have been considered but also in good "extra-plug" lateral, transverse and angular alignments between the two plugs when coupled together.

The aligning pins 45, 45' are oversize in the sense that they are of such diameter in relation to the cross-sectional size of their pin channels 115, 116 in plug 25 and 115', 116' in plug 25' that the pins cannot be frictionlessly slid into such channels. Instead the pins must be forced into such channels and are received therein with a playless fit. This could be done even if such channels were in the form of circular holes continuously surrounded around their peripheries by the material of the plug in which formed. The cost, however, of such would be that, with a deviation type increase in the diameter of the pin, the force needed advance the pin into the channel would rise very rapidly.

That problem is avoided in the plugs 25, 25' by having their pin channels defined by grooves formed in sections 96, 97 of the plugs which are laterally outward of the adhesive body 135 and are thus free to resiliently deform towards or away from each other to vary the transverse size of the pin channel. An example of such a pin channel is the channel 115 (FIG. 3) defined between the grooves 80a, 81b in, respectively, the outboard portions 96a, 97b of the guide plates 50a, 50b of plug 25. Those portions act as short deflectable cantilever beams, and the stiffness of such beams to resilient deflection is reduced by the necks 99a, 99b of reduced cross section by which such beams are joined to the laterally central regions 95a, 95b of those plates. Because resilient deformation of one or both of these portions 96, 97 permits varying the transverse size of pin channel 115 without the creation of undue stress, aligning pin 45 can readily be made sufficiently oversize to absorb, say, variations in the size of gap 100 (caused by deviation from nominal in the optical fibers f in the plug) or thermal variations in the diameter of the pin itself without becoming loose in the pin channel.

Another advantage of the resiliently deformable plate portions 96, 97 is that, when they are resiliently deformed towards or away from each other as a result of variations in the diameter of the aligning pin inserted into or removed from the channel 115, the two portions will deflect symmetrically relative to the center plane 200. In consequence, the axis 205 of pin 45 will remain in such plane unaffected by such resilient deformation responsive to such variations. Similarly the axes 105, 106 of pin channels 115 and 116 (FIG. 5) will be in and stay in plane 200 at all times despite any such variations.

What has just been said regarding resilient deformability applies to plug 25' and pin 45' as well as to plug 25 and pin 45.

Some advantages will now be considered of the noses 85, 85' on the plug 25, 25' and the end faces 88, 88' on these plugs. These end faces are smaller in area than the whole cross-sectional size, at their front ends, of plugs 25 and 25'. Thus, end faces 88, 88' are easier to polish and to render normal to the plug axes 130, 130' than would be the case for a front surface extending over the whole of such front ends.

Another benefit derived from having such noses 85, 85' is that when plugs 25, 25' are coupled together (FIG. 1), portions 210, 210' of the aligning pins are left exposed between the plugs 25, 25' to not be received in the pin channels of such plugs. For the pins to have such exposed portions is advantageous because, if necessary, they are free to deflect over the lengths of such portions to accommodate any difference in the respective lateral spacings in plugs 25 and 25' of the pin channels therein. Moreover, each such exposed portion may be made either incrementally shorter or incrementally longer in the event it is found desirable to incrementally change the angular position of one of plugs 25, 25' relative to the other.

The connector 20 described above is adapted to splice optical fibers with a mean loss of less than 0.3 dB and a stability within 0.1 dB between −40° C. to 85° C.

The above described embodiment being exemplary only, it is to be understood that additions thereto, omissions therefrom and modifications thereof can be made without departing from the spirit of the invention, and that accordingly the invention is not to be considered as limited save as consonant with the recitals of the following claims.

We claim:

1. The combination of elements for providing a multifiber optical plug comprising: lower and upper synthetic resinous guide plates each having a front and rear and having inner and outer transverse sides, and each having formed in its inner side a plurality of longitudinally-extending laterally-spaced V-sided receptacle grooves for a respectively corresponding plurality of optical fibers ("fiber grooves"), each such plate also having formed on its inner side a pair of V-shaped receptacle grooves for pins ("pin grooves") extending longitudinally parallel to said fiber grooves on laterally opposite sides thereof, and each pin groove being larger in lateral-transverse cross-section than any of said fiber grooves, each of said plates having the same nominal pattern of fiber grooves and pin grooves as the other, said plates being adapted to be positioned in use in transversely spaced relation parallel to each other with the upper plate being above and separated by a gap from such lower plate, and with their respective inner sides confronting each other so that their respective pin grooves are opposite each other to define two laterally spaced pin channels each comprising lower and upper pin grooves in respectively such lower and upper plates, and so that, moreover, their respective fiber grooves are likewise opposite each other to define laterally spaced fiber channels each comprising lower and upper fiber grooves in, respectively such lower and upper plates, plate retaining means adapted for maintaining such plates coupled in said transversely spaced relation, and an aligning pin adapted to be inserted in use in a corresponding one of said pin channels to fit therein without play so as to be partly received in such channel and to partly project forwardly therefrom for insertion into another multifiber optical plug.

2. The combination according to claim 1 in which each of said lower and upper plates is at least partly molded from a metallic mold insert derived from a silicon master chip so that at least portions of said grooves in each plate are positive replicas of corresponding grooves in said chip.

3. The combination according to claim 2 in which said portions of such plate grooves are, for both said plates, positive replicas of corresponding grooves in a silicon master chip common to both plates.

4. The combination according to claim 1 in which said lower and upper plates on their inner sides are, with respect to said fiber grooves and pin grooves on their inner sides, bilaterally symmetrical and nominally duplicates of each other.

5. The combination according to claim 1 which said pin grooves in each of said plates have respective rear portions of enlarged lateral-transverse cross section relative to forward portions of the same grooves.

6. The combination according to claim 1 in which said fiber grooves in each of said plates have respective rear portions of enlarged lateral-transverse cross section relative to forward portions of the same grooves.

7. The combination according to claim 1 in which each plate has at its front a projecting pedestal extending forwardly to a planar end face thereof normal to the longitudinal dimension of such plate, said pedestal being configured so that said fiber grooves in said plate extend forwardly though said pedestal to terminations of such grooves at said end face while said pin grooves, on the other hand, extend forwardly to terminations thereof falling short in the forward direction of said end face.

8. A multifiber optical plug termination comprising, lower and upper synthetic resinous guide plates each having a front and a rear and having formed in an inner side thereof a plurality of longitudinally extending laterally spaced V-sided receptacle grooves for optical fibers ("fiber grooves"), and each having also formed in such side a pair of V-sided receptacle grooves for pins ("pin grooves") extending longitudinally parallel to said fiber grooves on laterally opposite sides thereof, said pin grooves being each larger in lateral transverse cross section than any of said fiber grooves, and said plates being relatively disposed in transversely spaced relation with their inner sides confronting each other across a transverse gap therebetween so that their respective pin grooves are opposite each other to define two laterally spaced pin channels each comprising lower and upper pin grooves respective to said lower and upper plates, and so that, moreover, their respective fiber grooves are likewise opposite each other to define laterally spaced fiber channels each comprising lower and upper fiber grooves in, respectively, said lower and upper plates, a plurality of optical fibers respectively received in said fiber channels to extend longitudinally therethrough to exposed terminations of said fibers at the front of said plates, and a body of adhesive material disposed between said plates in said fiber channels and in portions of said gap laterally between adjacent fiber channels to embed said fibers in said fiber channels and to unite said plates by bonding them together so as to form a plate assembly.

9. A termination according to claim 8 in which said fibers deviate from nominal in diameter and have respective longitudinally-extending axes at the radial centers thereof, and in which said fibers are disposed in said fiber channels so that said axes all lie in a common plane in said transverse gap despite such deviation in fiber diameter.

10. A termination according to claim 9, which further comprises at least one circular cylindrical pin received in at least one of said pin channels and having a longitudinally-extending axis at the radial center of such pin lying in said gap.

11. A termination according to claim 8 in which said body of adhesive material between said plates terminates in the lateral extent thereof at two edges of said body disposed laterally inward of said two pin channels so as to leave said plates unbonded with each other laterally outward of said edges, and in which, accordingly, said plates on each of the laterally opposite sides of said plate assembly have portions capable of resilient deformation relative to each other to vary the displacement between the lower and upper pin grooves of said two pin channels.

12. A termination according to claim 11 further comprising at least one aligning pin received in at least one of said pin channels and of a radial size productive of resilient deformation of portions of said plates adjacent such channel so as to spread apart the lower and upper pin grooves of such channel.

13. A termination according to claim 12 in which such resiliently deformable portions of such plates undergo substantially equal deflections in accommodating such pin in said pin channel.

14. A termination according to claim 11 in which said plates have necks of reduced longitudinal-transverse cross section laterally outwards of said edges of adhesive material so as to reduce the stiffness of said plate portions to resilient deflection.

15. A termination according to claim 8 in which each plate has at its front a projecting pedestal extending forwardly to a planar end face thereof normal to the longitudinal axis of such plate, said pedestal being configured so that said fiber grooves in said plate extend forwardly through said pedestal to terminations of such grooves at said end face while said pin grooves, on the other hand, extend forward to terminations thereof falling short in the forward direction of said end face, and in which such pedestals of such two plates are included in a forwardly projecting nose provided for said plug termination and having a polished planar front surface comprising such end faces of such pedestals and surface areas of said optical fibers and of the adhesive material in which such fibers are embedded.

16. A multifiber optical connector comprising: first and second plugs each having a front and rear and each comprising lower and upper synthetic resinous guide plates each having on an inner side thereof an array of longitudinal laterally spaced parallel V-sided fiber receptacle grooves ("fiber grooves") and a pair of longitudinal V-sided pin receptacle grooves ("pin grooves") on laterally opposite sides of such array and extending parallel to said fiber grooves, said pin grooves being greater in lateral cross section than said fiber grooves, and said plates being in transversely spaced relation with their inner sides confronting each other across a transverse gap therebetween so that their respective pin grooves are opposite each other to define two pin channels each comprising an upper and a lower pin groove, and so that their respective fiber grooves define an array of fiber channels each comprising an upper and a lower fiber groove, plate retaining means for maintaining said lower and upper plates in each of said plugs in said transversely spaced relation, optical fibers longitudinally extending in said fiber channels in each of said plugs to terminations of said fibers at the front of said plugs, and a pair of aligning pins each received in a pin channel respective thereto in both one and the other of said plugs to produce between the optical fiber terminations in respectively said first and second plugs an alignment whereby said fibers in said first plug and said fibers in said second plug are optically coupled with each other.

17. A multifiber optical connector comprising: first and second plugs each comprising a synthetic resinous casing having a longitudinally separated front and rear, such casing of each such plug having formed therein a pair of pin receptacle channels on laterally opposite sides of said casing and extending longitudinally therein to terminations of such channels at the front of such casing, each such plug also having at the front of its casing a laterally central nose projecting forwardly of such terminations and having a planar front surface normal to the longitudinal axis of such plug, and each such plug having formed in its casing a plurality of fiber receptacle channels adapted to receive respective optical fibers therein and extending longitudinally in such casing to openings thereof formed in said front surface of said nose on such casing, and a pair of aligning pins each received in a pin receptacle channel respective thereto in both one and the other of said plugs to position the noses at the fronts of said first and second plugs in confronting relation with each other and to produce alignment between said openings in said first plug and said openings in said second plug of said fiber receptacle channels.

18. An optical splice plug for a plurality of optical fibers comprising: lower and upper synthetic resinous guide plates having respective inner sides, and each having formed in its inner side an array of longitudinal grooves for receiving such fibers ("fiber grooves") and, on laterally opposite sides of such fiber grooves, a pair of grooves for receiving pins for alignedly coupling such plug with another optical device ("pin grooves"), said pin grooves having cross-sectional sizes greater by at least one order of magnitude than those of said fiber grooves, said plates being in transversely superposed relation with their inner sides confronting each other across a transverse gap therebetween so that their respective pin grooves are opposite each other to define for such pins two channels each comprising an upper and a lower pin groove and a portion therebetween of said gap, and so that their respective fiber grooves are opposite each other to define for said fibers an array of channels each comprising an upper and lower fiber groove and a portion therebetween of said gap, the axis of each of such pin channels being disposed within said gap, and said plug further comprising means for maintaining said plates in said superposed relation.

19. An optical splice plug according to claim 18 in which the patterns of fiber grooves and pin grooves formed in, respectively, said lower and upper plates are duplicates of each other, and in which such groove pattern of said upper plate is, from a reference position therefor the same as said lower plate, rotated about a longitudinal axis for said upper plate one hundred and eighty degrees (180°) relative to such groove pattern in said lower plate when said two plates have said transversely superposed relation thereof.

20. An optical splice plug for a plurality of optical fibers comprising: a synthetic resinous casing for said fibers, said casing having a laterally central region including longitudinal passages therein for longitudinal traversal of such fibers in and to the front of said casing, and said casing also having outer sections on laterally opposite sides of said central region and each including upper and lower casing portions constituting respective cantilever beams separated by a transverse gap therebetween and having inward ends anchored to said central region and laterally outward free ends, the upper and lower beams in each such section having formed therein respective longitudinal grooves disposed opposite each other on opposite sides of such gap between such beams to define a channel including the upper and lower ones of such grooves and a portion therebetween of such gap, such two channels thus defined being for reception therein of pins for alignedly coupling said plug with another optical device, and said beams in each such section being relatively movable by resilient deformation to vary the size of the channel in such section so as to accommodate therein with a playless fit any of a plurality of oversize pins of differing diameter.

21. An optical splice plug according to claim 20 in which both beams in each such outer section are each resiliently deflectable towards and away from each other and symmetrically in relation to such gap between such beams to thereby keep the axis of such channel in said gap during beam deflection.

22. A method of making an optical splice device for a plurality of optical fibers comprising: forming in first and second synthetic resinous plates respective patterns of longitudinal fiber receptacle grooves extending inwards from planar faces on said plates, and which groove patterns on said plates are each derived from a master groove pattern on a silicon chip so as to be duplicates of each other, rotating said second plate about its longitudinal axis one hundred and eighty degrees (180°) relative to said first plate to cause the groove pattern on said second plate to face in the opposite transverse direction than that such pattern on said first plate, superposing said plates in the transverse direction to be spaced apart by a transverse gap therebetween and so that pairs of fiber receptacle grooves respectively formed in said plates and having corresponding deviations from nominal register with each other across said gap and define for each such each such pair a fiber receptacle channel comprising the grooves in that pair and the portion of the gap therebetween, and positioning in each such channel a respective one of said fibers.

23. A method according to claim 22 in which said groove patterns are each bilaterally symmetrical about a plane normal to and bisecting said pattern, and in which said second plate is so rotated about its longitudinal axes without accompanying rotation of such second plate about an axis normal to the groove pattern therein.

24. A method according to claim 22 in which the groove patterns in said plates are longitudinally undifferentiated while, lacking in bilateral symmetry about the longitudinal axis for such patterns, and in which said rotating of said second plate about its longitudinal axis is supplemented by a rotation of such plate one hundred eighty degrees (180°) about an axis normal to the groove pattern therein.

25. The method according to claim 22 further comprising applying to the assembly of said plates and the fibers therebetween a force pressing said plates together, and controlling the amount of said force so as to produce a positioning of the respective axes of all said fibers in a common lateral-longitudinal plane in said gap.

26. A method of treating an optical splice plug comprising a casing and at lease one optical fiber extending in said casing to the front end thereof, said method comprising attaching to said plug, in fixed position relative thereto, an implement having a planar surface extending at least partly around said front end of said plug and defining a reference plane therefor, applying to said end abrasive material on a planar backing to grind down and polish said end, and continuing such action of such material until it makes flush contact with said planar surface of said implement.

27. A method of making an optical splice device for a plurality of optical fibers comprising: providing a pair of plates each having formed in one of its sides a set of parallel fiber receptacle grooves, juxtaposing said plates and fibers so that said plates are separated by a gap with their respective grooves confronting each other, and so that said fibers lie between said grooves in respective channels each defined by a pair of grooves formed in opposite side of said gap in one and the other of said plates, applying force to the assembly of said plates and fibers to press said fibers between them, introducing adhesive into said channels while said force is being applied so that such adhesive occupies both portions of said channels around said fibers and portions of said gap between adjacent of such channels, continuing application of said force while allowing said adhesive to cure until it bonds said plates together, and then removing said force from said assembly.

28. The combination according to claim 1 further comprising a pair of spacer pins greater in diameter than said aligning pin, said two spacer pins being adapted, during fabrication of said plug, to be respectively inserted into said two pin channels to increase the size of said gap and, upon reception thereafter of said fibers in said fiber grooves, to be removed from said pin channels.

* * * * *